United States Patent [19]

Martin et al.

[11] Patent Number: 4,828,453
[45] Date of Patent: May 9, 1989

[54] MODULAR MULTIMORPHIC KINEMATIC ARM STRUCTURE AND PITCH AND YAW JOINT FOR SAME

[75] Inventors: H. Lee Martin, Knoxville; Daniel M. Williams, Oliver Springs; W. Eugene Holt, Knoxville, all of Tenn.

[73] Assignee: The United States of America as represented by the United States Department of Energy, Washington, D.C.

[21] Appl. No.: 41,025

[22] Filed: Apr. 21, 1987

[51] Int. Cl.[4] .................... B25J 17/00; B25J 17/02
[52] U.S. Cl. .................................. 414/738; 74/479; 74/665 C; 901/15; 901/26; 901/28; 901/29
[58] Field of Search ............... 414/729, 735, 738, 739; 901/28, 29, 23, 24, 26, 15; 74/665 C, 479

[56] References Cited

U.S. PATENT DOCUMENTS

| | | | |
|---|---|---|---|
| 3,817,403 | 6/1974 | Glachet | 901/26 X |
| 4,308,584 | 12/1981 | Arai | 901/15 X |
| 4,480,495 | 11/1984 | Obama | 74/479 |
| 4,568,311 | 2/1986 | Miyake | 901/15 X |
| 4,685,349 | 8/1987 | Wada et al. | 901/15 X |

FOREIGN PATENT DOCUMENTS 0598749  3/1978  U.S.S.R. .................... 901/26

OTHER PUBLICATIONS

Martin et al., "Recommendations for the Next-Generation Space Telerobot System", ORNL Publication ORNL/TM-9951.
Hollerbach, "Optimum Kinematic Design for a Seven Degree of Freedom Manipulator", MIT Artificial Intelligence Laboratory, Cambridge, MA, 1983.
Lowenthal, et al, "Application of Traction Drives as Servo Mechanisms", pp. 119-133.
Goertz et al., "ANL Mark E4A Electric Master-Slave Manipulator", Proceedings of 14th Conference on Remote Systems Technology, 1966.
Jelatis et al., "A Triac Output Control System for Two-Phase Servodriven Master-Slave Manipulators", Proceedings of the 25th Conference on Remote Systems Technology, 1977.
Flatau, "SM-229-A New Compact Servo Master-Slave Manipulator", Proceedings of the 25th Conference on Remote Systems Tech., 1977.
White et al., "Surveillance Robot for Nuclear Power Plants," Proceedings, 33rd Conference on Remote Systems Technology, 1985.

Primary Examiner—Robert J. Spar
Assistant Examiner—Donald W. Underwood
Attorney, Agent, or Firm—Stephen D. Hamel; William R. Moser

[57] ABSTRACT

A multimorphic kinematic manipulator arm is provided with seven degrees of freedom and modular kinematic redundancy through identical pitch/yaw, shoulder, elbow and wrist joints and a wrist roll device at the wrist joint, which further provides to the manipulator arm an obstacle avoidance capability. The modular pitch/yaw joints are traction drive devices which provide backlash free operation with smooth torque transmission and enhanced rigidity. A dual input drive arrangement is provided for each joint resulting in a reduction of the load required to be assumed by each drive and providing selective pitch and yaw motions by control of the relative rotational directions of the input drive.

23 Claims, 10 Drawing Sheets

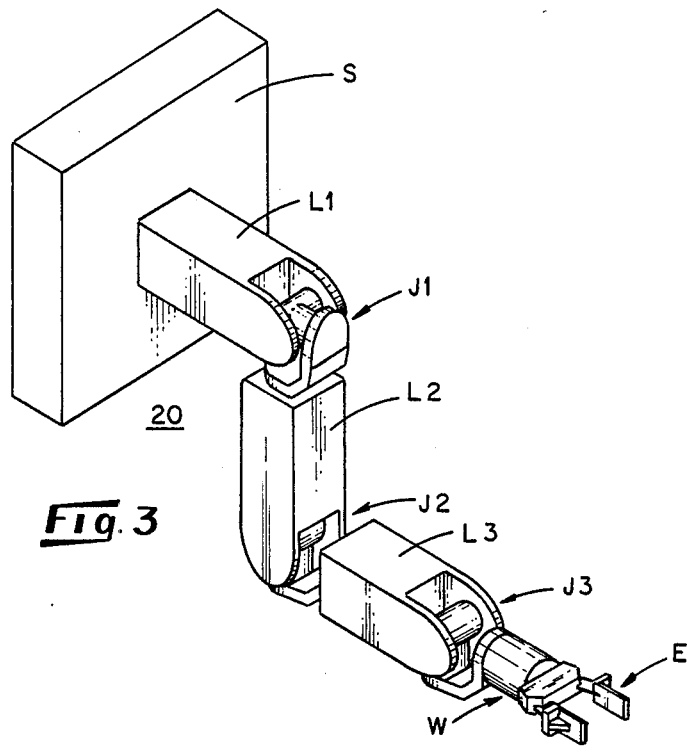
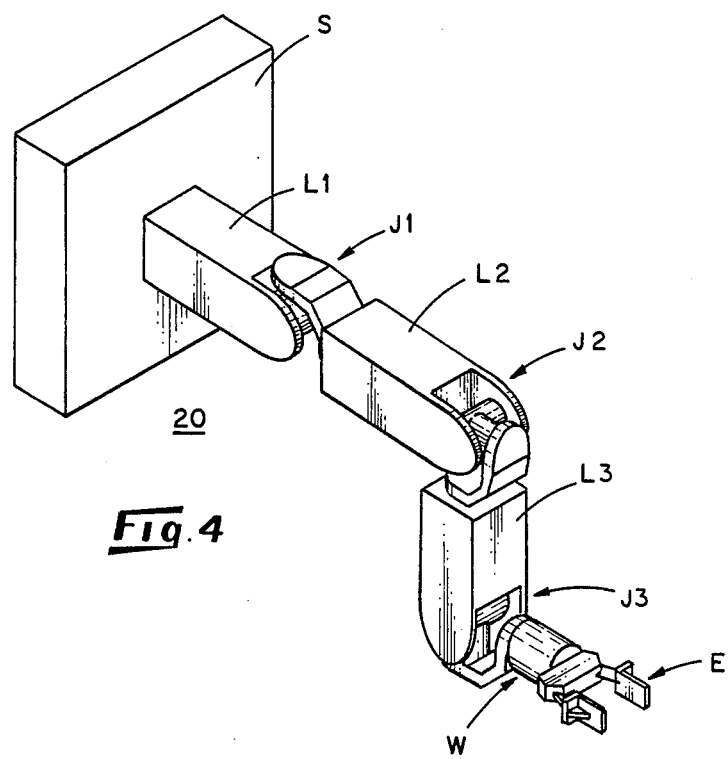

MODULAR MULTIMORPHIC KINEMATIC ARM STRUCTURE AND PITCH AND YAW JOINT FOR SAME

BACKGROUND OF THE INVENTION

The present invention relates to modular multimorphic kinematic manipulator arm structures and more particularly to a kinematic robotic manipulator arm having replicated pitch/yaw roller differentials at the shoulder, elbow and wrist thereof which together with a rotary end output device comprise such a manipulator arm with seven degrees of freedom.

Servomanipulators for material handling are needed for hostile environments such as nuclear fuel recycling centers and outer space applications. Present servomanipulators are complex and expensive mechanisms that are primarily constructed with six degrees of freedom (hereinafter "DOF"). Three of these DOF are for position and three are for orientation of the manipulator devices of the prior art.

A major problem with servomanipulators having six DOF is that they have no obstacle avoidance capabilities. Accordingly, there is a need in the art for devices which can avoid obstacles in the performance of servomanipulation functions. By the same token, a need is also present to provide such a device which is relatively simplistic and less expensive than present day servomanipulators.

SUMMARY OF INVENTION

It is therefore, a primary object of the present invention to provide a new and novel servomanipulator having obstacle avoidance capabilities.

Another object of the present invention is to provide a new and novel servomanipulator having obstacle avoidance capabilities which is relatively simplistic and inexpensive as compared to presently available devices.

Still another object of the present invention is to provide a new and novel servomanipulator having obstacle avoidance capability which provides satisfactory operation with both teleoperated and robotic systems.

These and other objects of the present invention will become more fully apparent with reference to the following specification and drawings which relate to a preferred embodiment of the present invention.

These and other objects of the present invention are fulfilled by providing a manipulator arm having kinematic redundancy in the shoulder, elbow and wrist joints. This kinematic redundancy is provided by three identical pitch/yaw joints, one as each of the said shoulder, elbow and wrist joints. The system of the manipulator arm is completed by an output roll function at the wrist joint to provide seven (7) DOF.

Each pitch/yaw joint comprises a differential drive mechanism having two inputs and two outputs that rotate about orthogonal axes.

The differential drive mechanisms of the present invention are traction drives which provide steady and smooth force transfer without backlash and with an enhanced stiffness of the manipulator arm.

More specifically, each pitch/yaw differential drive includes two drawing rollers which provide input into the differential and which provide the advantage that each roller need transmit only one-half of the torque necessary to make a particular motion with the output of that drive mechanism. The drive rollers interface with intermediate rollers which in turn drive a pitch/yaw roller about the pitch and yaw axes of the drive mechanism. The particular axis about which the pitch/yaw roller is constrained to rotate depends upon the direction of rotation of the driving rollers. For example, when the driving rollers are rotated in opposite directions, the pitch/yaw roller is constrained to rotate about the pitch axis; and when both driving rollers are rotated in the same direction, the pitch/yaw roller is constrained to rotate about the yaw axis. Position encoders are provided to monitor both pitch and yaw axis position coordinates of the pitch/yaw roller to maximize positional accuracy. Servo-motors and a control system which includes the position encoders and torque sensors for the input driving rollers are provided to render each of the pitch/yaw joints controllable and accurately positionable in the provision of the obstacle avoiding manipulator arm of the present invention.

BRIEF DESCRIPTION OF THE DRAWINGS

The objects and many of the attendant advantages of the present invention will be readily appreciated as the same becomes better understood by reference to the following detailed description, when considered in conjunction with the accompanying drawings, in which like reference numerals and/or indicia designate like parts throughout the figures thereof, and wherein:

FIG. 3 is a schematic of the multimorphic modular control arm of the present invention in an anthromorphic operating mode;

FIG. 4 is a schematic of the multimorphic modular control arm of the present invention in an over-the-wall operating mode;

DETAILED DESCRIPTION OF THE DRAWINGS

Figure 1:
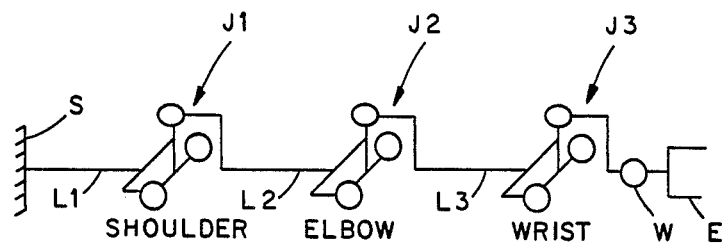
FIG. 1 is a schematic of a multimorphic modular control arm of the present invention.

Referring in detail to the drawings and with particular reference to FIG. 1, a schematic diagram of the modular multimorphic kinematic manipulator arm structure 20 of the present invention is shown as including, from a shoulder adjacent position at the left side thereof a pitch/yaw shoulder joint J1, a pitch/yaw elbow joint J2, and a pitch/jaw wrist joint J3, all interconnected, in sequence, by links L1, L2 and L3. The link L1 is connected to a support means S schematically illustrated at the left hand side of the schematic and to one side of the shoulder joint J1; the link L2 is common to the shoulder and elbow joints J1 and J2, respectively, and the link L3 is common to the elbow and wrist joints J2 and J3, respectively. At the output of the wrist joint J3 is a link L4 on which is mounted for rotation, a wrist roll device W on which is mounted an end effector E which is any suitable tool or appliance for engaging and/or manipulating objects and the like in response to motions of the manipulator arm.

Figure 2:
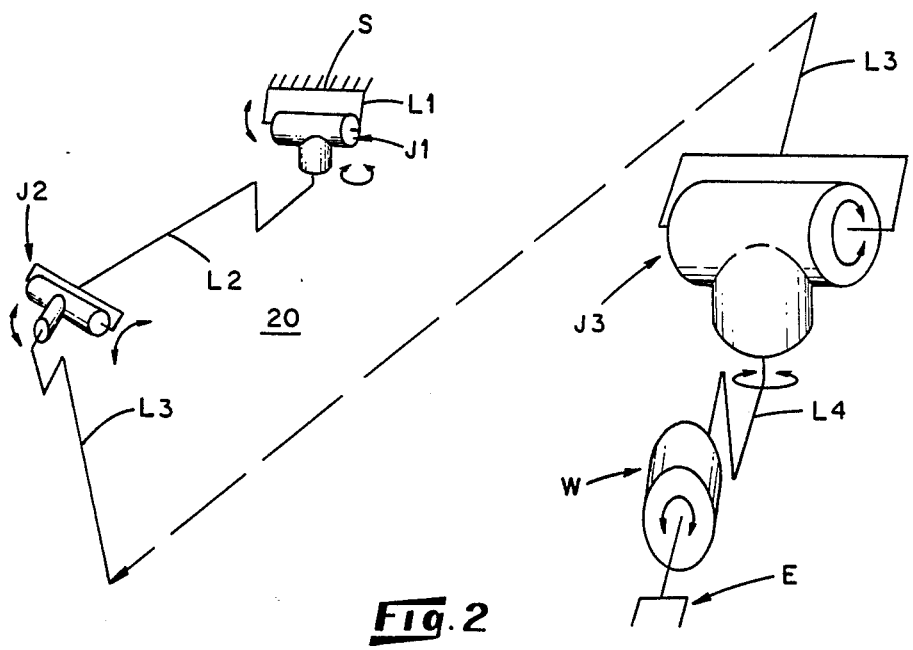
FIG. 2 is a schematic of a multimorphic modular control are of the type illustrated in FIG. 1 illustrating its kinematic redundancy.

Each of the shoulder, elbow and wrist joints, J1, J2 and J3, respectively, supplies two degrees of freedom to the manipulator arm 20 and the wrist roll device W supplies a purely rotational single degree of freedom for a total of seven degrees of freedom in the manipulator arm 20. This, as will be hereinafter more fully described, provides obstacle avoidance capabilities in the manipulator arm structure 20. Referring next to FIG. 2, the manipulator arm configuration 20 is illustrated in a schematic position which can be described as an over-the-wall stance or position of the arm structure, in which the arm can be utilized to reach over a barrier between the support means and the object to be manipulated by the control arm 20.

As can be seen from the double ended rotational arrows present at each of the joints J1, J2 and J3 and the wrist roll device W there are seven degrees of rotational freedom in the arm structure 20 with each of the shoulder, elbow and wrist joints J1, J2 an J3, respectively, having rotational adjustments in pitch and yaw. It should also be noted that the arm structure 20 has complete kinematic redundancy in the said shoulder, elbow and wrist joints, all of these joints being substantially identical and having rotational freedom about their respective pitch and yaw axes as will hereinafter more fully described.

Figure 5:
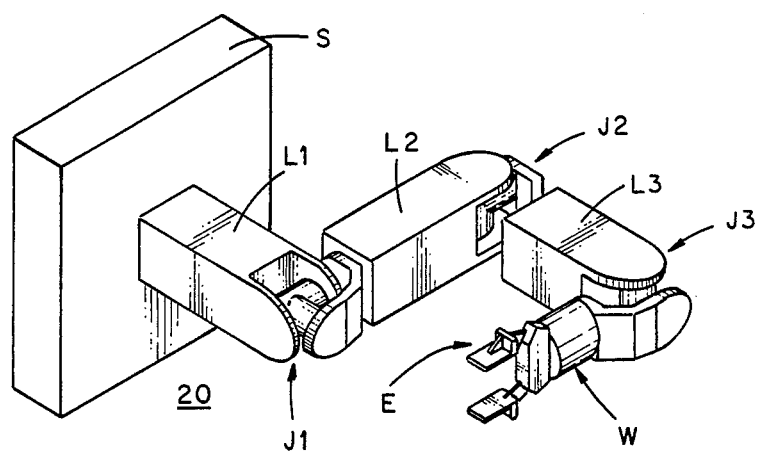
FIG. 5 is a schematic of the multimorphic modular control arm of the present invention in a sidewinder (planner) operating mode.
Figure 6:
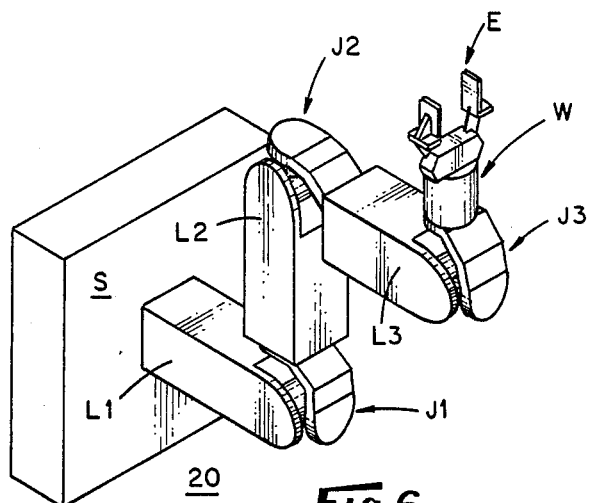
FIG. 6 is a schematic of the multimorphic operating arm of the present invention in an under-the-table operating mode.

Referring next to FIGS. 3 through 6, a three dimensional embodiment of the arm structure 20 of the present invention is illustrated with four basic stances or positions shown to illustrate the kinematic dexterity and active reconfigurability thereof. For example, in FIG. 3 a stance is illustrated which has been designated "anthropomorphic", suggesting a similar position to a partially outstretched human arm. In FIG. 4, the stance labeled "over-the-wall" is portrayed three dimensionally to portray the same stance which was schematically illustrated in FIG. 2. In FIG. 5, the arm 20 is placed in a plainer configuration which has also been dubbed "side-winder" because of its snake-like configuration. In FIG. 6, the configuration of the arm 20 has been designated "under-the-table" since it appears similar to the configuration assumed by a human arm reaching beneath a table in retrieve an object from the undersurface of the table.

Figure 7:
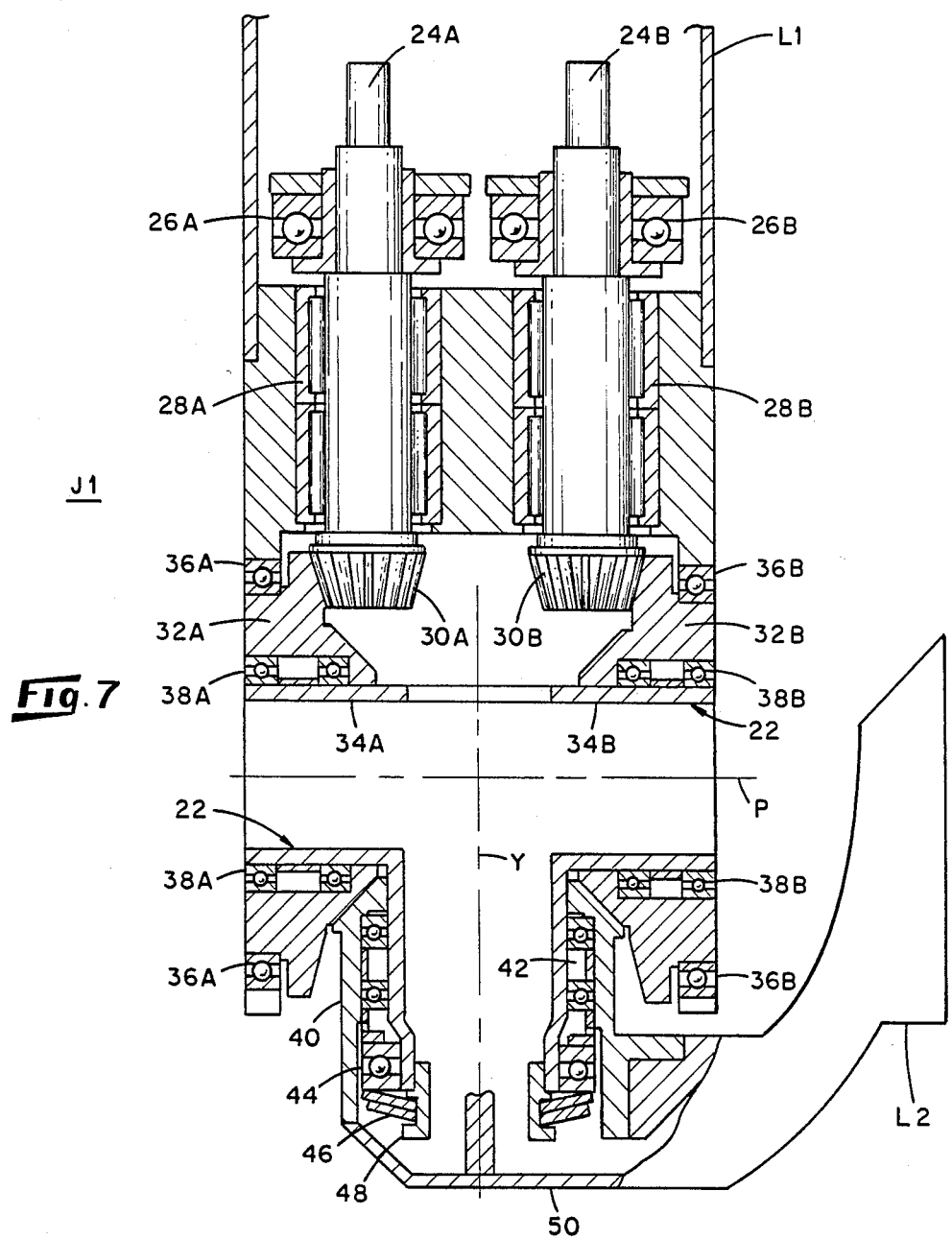
FIG. 7 is an enlarged elevational detail in partial cross-section of a pitch/jaw kinematic joint structure for the shoulder, elbow and wrist joints of the multimorphic modular control arm of the present invention.

Referring next to FIG. 7, some of the internal detail of a typical one of the shoulder, elbow and wrist joints, which has been designated J1 for exemplary purposes, is shown as including portions of the first link L1 and second link L2 at the input and output sides thereof, respectively. For the purpose of this description, the input side shall always be the side of any given joint in the chain of joints J1 . . . J3 closest to the support and the output side of a given joint shall be the side farthest removed from the support S in that chain.

Accordingly, the first link L1 is an input link vis-a-vis the shoulder joint J1 and the second link L2 is an output link vis-a-vis that joint. The joint J1 is illustrated as including a T-bar 22 which is hollow and tubular and in which the leg of the T is concentric with a yaw axis Y and in which the cross bar of the T is concentric with the pitch axis P of the joint J1.

As will now be more fully described, the joint J1 comprises a traction drive device for selectively providing rotation of the T-bar 22 about the pitch and yaw axes P and Y, respectively. The input link L1 includes input spindles 24A and 24B having axes of rotation extending longitudinally of said input link L1 and which are held by thrust bearings 26A and 26B, respectively, to rotate within fixed journal bearing sleeves 28A and 28B in either like or opposite directions to cause rotation of integrally attached bevelled traction drive rollers 30A and 30B, respectively. These traction drive rollers 30A and 30B engage, respectively, first and second intermediate traction rollers 32A and 32B which are journalled for rotation within the input link L1 and about the pitch axis P on respectively opposite ends 34A and 34B of the cross-bar portion of the T-bar 22 in journal bearings 36A and 36B and 38A and 38B, respectively. Therefore, there is provided through the beariangs 38A and 38B, relative rotation between the intermediate traction rollers 32A and 32B and the cross-bar portion of the T-bar 22 about the pitch axis P.

Rotation of the T-bar 22 about the yaw axis Y is provided by mounting an output traction roller 40, also referred to as a pitch/yaw roller 40, for relative rotation with respect to the vertical leg portion of the T-bar 22 by means of journal bearings 42 and thrust bearings 44, the thrust on which is accommodated by a Belleville spring preload mechanism 46 retained by a suitable collar 48 in the lowermost end of the vertical leg of the T-bar 22. The pitch/yaw roller 40 is an intergral part of an extension 50 of the output link L2 such that any motion of the pitch/yaw roller 40 is faithfully duplicated by the output link L2.

Figure 8:
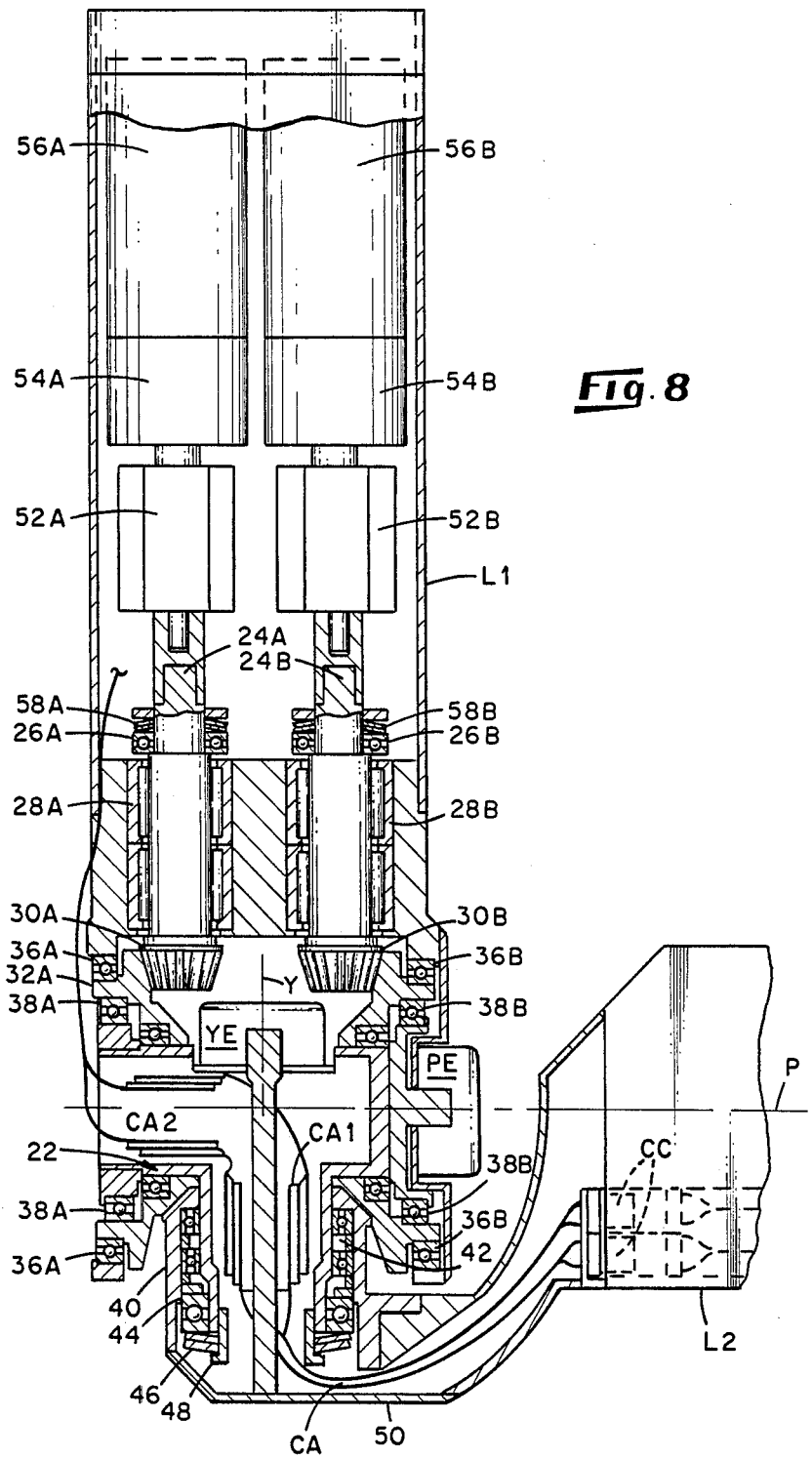
FIG. 8 is a detailed elevation similar to that shown in FIG. 7 but including drive and positional encoding means and further illustrating, electrical cables and connections.
Figure 9:
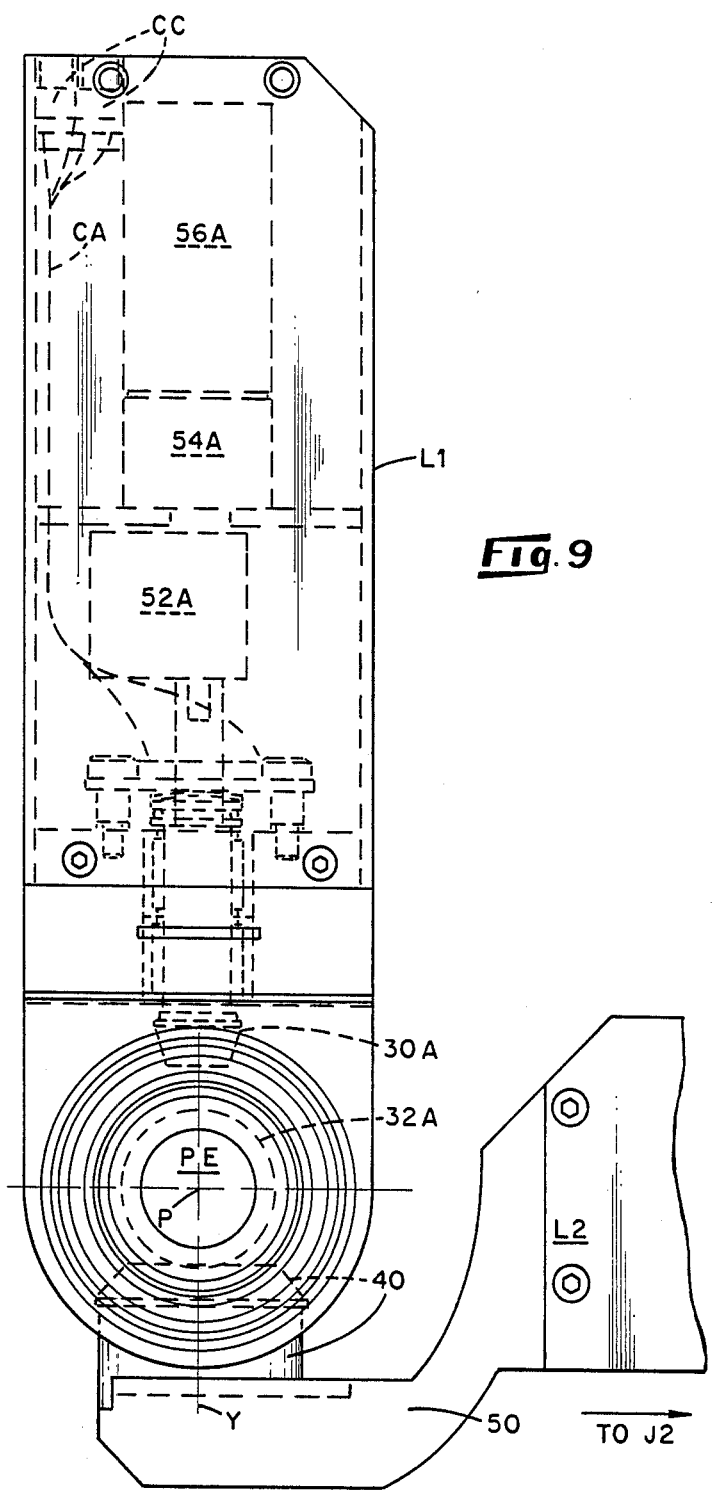
FIG. 9 is a side elevation of the joint structure of FIG. 8.

Referring additionally to FIGS. 8 and 9 it is shown that the input spindles 24A and 24B are coupled through torque sensors 52A and 52B, respectively, back though speed reduction gear heads 54A and 54B, respectively, to first and second servo motors 56A and 56B, respectively, mounted in the input link L1. Additionally, the thrust bearings 26A and 26B on the first and second input spindles 24A and 24B, respectively, are provided with Belleville spring preload devices 58A and 58B, respectively. As illustrated, the input drive spindles 24A and 24B and the traction drive rollers 30A and 30B, respectively, driven thereby, rotate about axes parallel with the longitudinal axis of the input link L1.

First and second position encoders YE and PE are mounted, respectively, on the yaw and pitch axes of the joint J1 so that the relative rotational positions assumed about those axes between the input link L1 and the output link L2 may be accurately determined. Suitable state of the art optical or magnetic position encoders and the like may be utilized.

Figure 10:
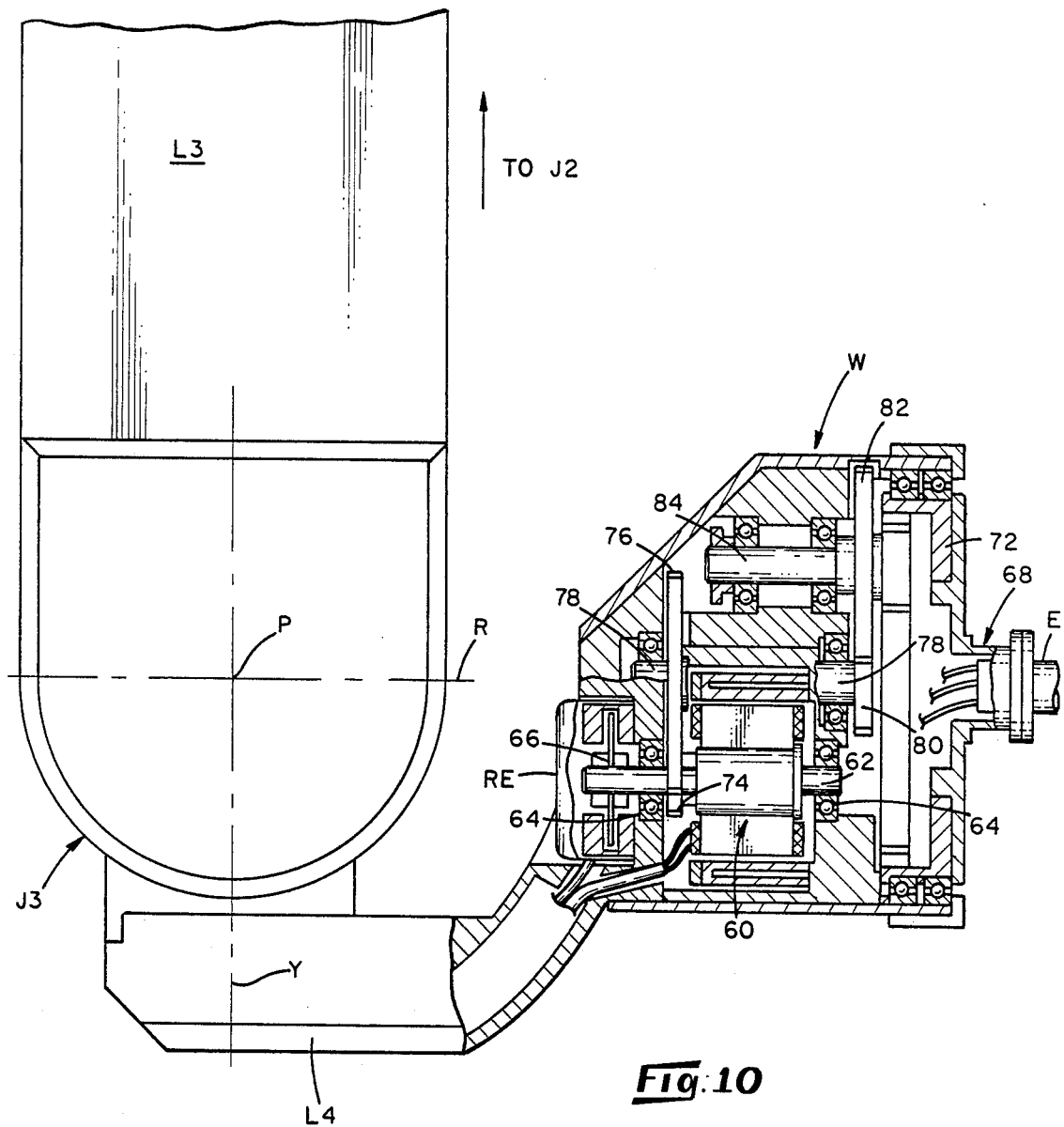
FIG. 10 is an enlarged elevational detail in partial cross-section of a wrist roll joint mechanism providing the seventh degree of freedom to the multimorphic modular control arm of the present invention.
Figure 11:
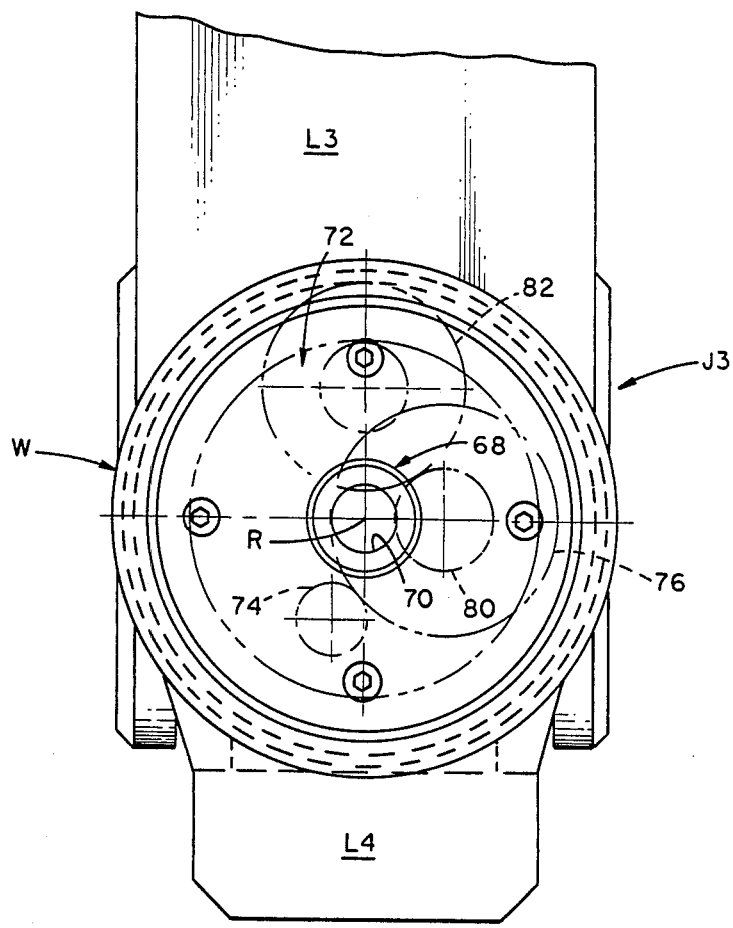
FIG. 11 is an end view of the wrist roll joint of FIG. 9 illustrating the relative axial positions of the several traction drive rollers therein.

Referring next to FIGS. 10 and 11, the wrist roll mechanism W of the present invention is shown mounted adjacent the wrist joint J3 on the output link L4 of that wrist joint. The wrist roll mechanism W is provided with a servomotor drive 60 having a rotor shaft 62 mounted within bearings 64 at each end thereof with one end of the rotor 62 carrying the rotor portion 66 of a shaft position encoder RE to encode the position achieved by the wrist roll device W about the roll axis R. The roll axis R is shown as displaced from the shaft 62 of the servmotor 60 and extends on the line from the intersection of the pitch and yaw axis of a joint J3 through an output chuck 68 which is coaxial therewith. The chuck 68 is adapted to receive an end effector E as generally illustrated in FIG. 10. The end effector E is not shown in FIG. 11 but rather, is removed to illustrate the cavity 70 of the chuck 68 concentrically disposed with respect to the roll axis R. Thus, it can be seen that the wrist roll assembly W tracks the movements of the output link L4 of the wrist joint J3 about both the pitch and yaw axes P and Y of the wrist joint J3.

The chuck 68 of the wrist roll assembly W is mounted to a traction ring 72 which is driven by a suitable friction drive train or traction drive means from the servo motor 60. The traction drive means, as shown, consists of a first traction roller 74 on the shaft 62 of the servo motor 60 which in turn drives another traction roller 76 mounted adjacent thereto within the wrist roll assembly W on a shaft 78. The shaft 78 includes at its opposite end a friction roll 80 which in turn drives a friction roll 82 journalled within the wrist roll device W on a shaft 84. Also on the shaft 84 is another traction roller 86 driven thereby which is in driving engagement with the traction surface of the traction ring 72 which is integral with the chuck 68. Thus, the chuck 68 is driven through a traction drive or friction gear train having its input torque supplied by the servo motor 60 within the wrist roll assembly W. As shown in FIG. 11, the friction ring 72 comprises the major portion of the face of the wrist roll assembly W where the end effector E or other suitable tools or appliance is to be placed within the cavity 70 of the chuck 68.

OPERATION

Figure 12A:
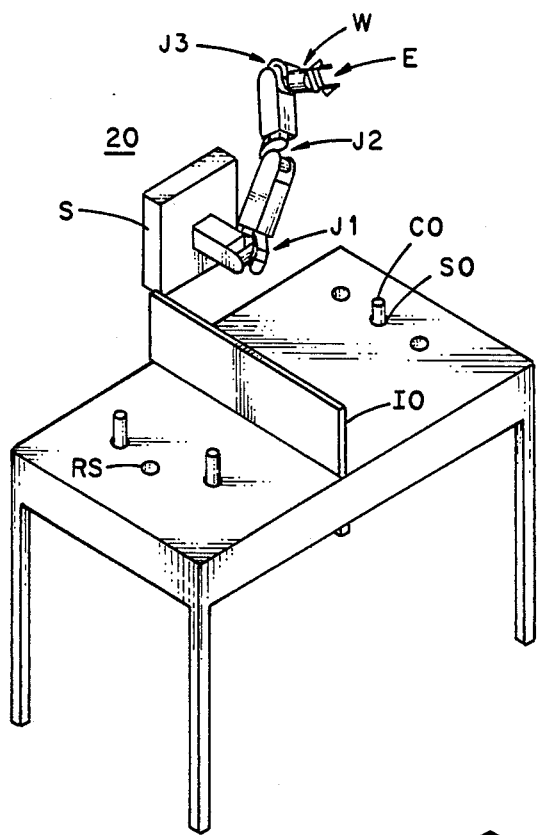
FIGS. 12(a) through 12(c) illustrate an operating sequence of the multimorphic modular control arm of the present invention in the over-the-wall operating mode
Figure 12B:
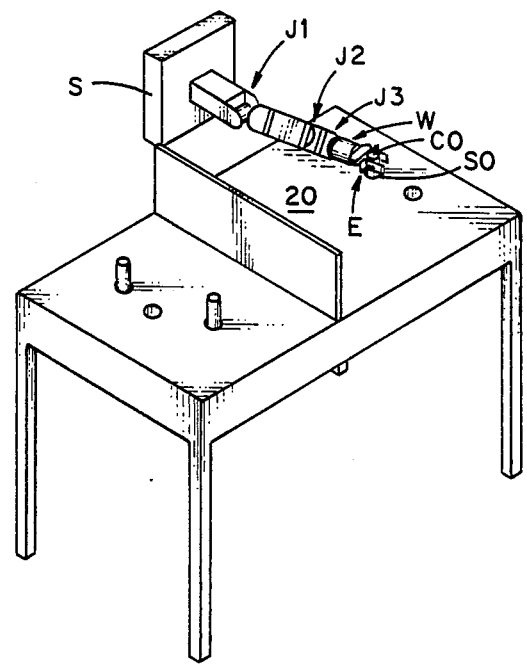
Figure 12C:
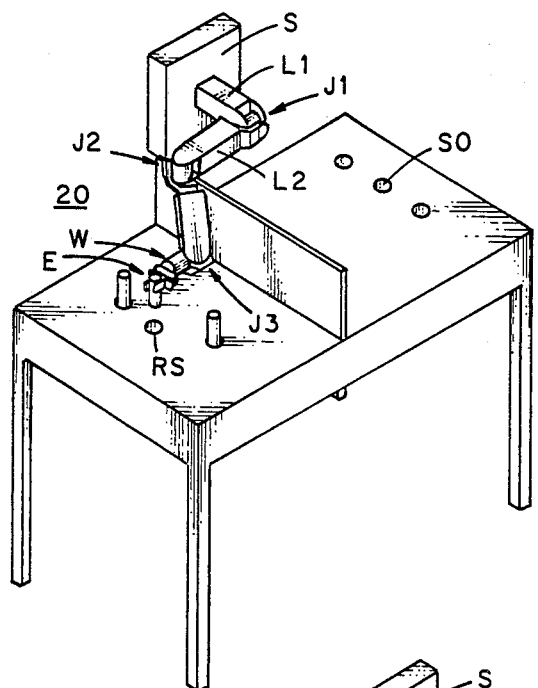

Referring to FIGS. 12A, 12B, 12C and 12D, the control arm 20 of the present invention is schematically shown in a sequence maneuvering a cylindrical object CO from a socket SO in which it is mounted across a intermediate obstacle IO into a receiving socket RS. On the opposite side of the intermediate obstacle IO. Starting from the position illustrated in FIG. 12A, which shows the cylindrical object CO in the socket SO with the arm 20 in an upraised position, it can be seen that the joints J1, J2 and J3 of the arm together with the wrist roll means W and end effector E have been manipulated to the configuration of FIG. 12B such that the end effector E engages and grips the cylindrical object CO still in its original socket SO. Thereafter, the arm 20 is reconfigured to carry the cylindrical object CO up and over the intermediate obstacle IO to a position above the receiving socket RS on the opposite side of the intermediate obstacle IO as illustrated in FIG. 12C. As can be seen with reference to FIG. 12C, the stance or position assumed by the arm 20 is similar to the "over-the-wall" stance illustrated in FIG. 4 except that the links L1 and L2 are at right angles to one another in the same plane rather than extended along the same line.

Figure 12D:
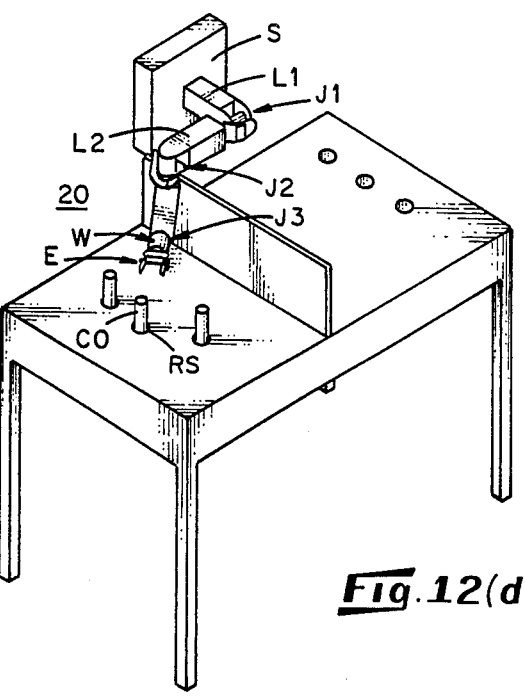

After positioning the cylindrical object CO over the receiving socket RS the arm 20 is again reconfigured to lower the cylindrical object CO into the receiving socket RS whereupon the end effector E releases that object and the arm retracts to the position shown in FIG. 12D. It should be understood that all of the reconfigurating of the arm is accomplished through suitable signals applied to the various servomotors such as the input drive motors 56A and 56B for each of the shoulder, elbow and wrist joints J1 through J3 and the servomotor E 60 in the wrist roll assembly W. The end effector is also operated by suitable electrical signals as is known in the art. This end effector may be, for example, an EP 100/30 general purpose end effector manufactured by Teleoperator Systems Corporation of Bohemia, N.Y. Other suitable end effector devices or appliances or operating tools known to those of ordinary skill in the art may be utilized also. All of the signals provided to the various servomotors to effectuate the reconfigurations and configurations of the arm 20 are provided through suitable cabling. For example, as illustrated in FIG. 8, cables CA are connected through electrical cable connectors CC in the ends of the link L2, as illustrated, and in the top of the link L1 as illustrated in FIG. 9 and the cables are extended between various cable terminals through the joints by forming first and second helical coils CA1 and CA2, respectively, in the cable with the helical coil CA1 being disposed concentric to the yaw axis Y and the helical coil CA2 being disposed concentric to the pitch axis P within the T-bars 22 in each of the joints so that full mobility of the joint is effectuated and the cable may run cleanly through the assembly. Otherwise, the cables run inside the various links L1, L2, L3 and L4 in the manner shown for the linkds L1 and L2.

By way of further explanation of the operation of the pitch/yaw joints J1 through J3, reference is made to FIGS. 7 and 8 wherein the differential traction drive mechanisms comprising each of said joints is shown as having the two inputs (servo motors 56A, 56B driving traction rollers 30A and 30B, respectively) which provide either rotations of like directions or opposite directions to the differential intermediate traction rollers 32A and 32B to thereby cause the pitch/yaw traction roller 40 to rotate about either the pitch axis or the yaw axis as follows:

When the pitch/yaw roller 40 is to be driven about the pitch axis, the input drive rollers 30A and 30B are rotated in opposite directions by the servomotors 56A and 56B thereby causing rotation in like directions of the intermediate traction rollers 32A and 32B. This results in the intermediate traction rollers 32A and 32B forcing the pitch/yaw roller either into the paper or out of the paper for rotation about the pitch axis P in the cross sections illustrated in FIGS. 7 and 8.

Achievement of rotation of the pitch/yaw traction roller 40 about the yaw axis of a given joint occurs when both the drive roller 30A and 30B are driven in the same directions rotationally thereby causing opposite rotational direction to occur in the intermediate traction rollers 32A and 32B, respectively, which in turn cause a rotation of the pitch/yaw roller 40 about the yaw axis Y of the joint J1.

This invention also achieves a significant advantage in that each drive roller 30A and 30B and its related servomotor 56A and 56B need only transmit one half of the torque required to cause a particular motion to be made under a given of the arm 20. Also, since the entire differential drive is a traction drive mechanism there are no torsional isolations caused by load transfers between gear teeth and the force transfer through the joints is inherently smooth and steady without backlash and relatively stiff in comparison to an arm assembly in which conventional gearing is utilized.

Suitable traction is achieved through the several Belleville spring preload mechanisms 58A, 58B and 46 which ensure that there is sufficient thrust load imparted to the several traction rollers and pitch/yaw roller 40 to undertake the normal torque loads for which the particular arm 20 is designed.

Suitable traction fluids are utilized for lubrication which vary depending upon application as is known to those in ordinary skill in the art. The pitch/yaw joint J1 . . . J3 of the present invention by a modular multimorphic kinematic arm exhibiting substantially zero backlash, smoothness, stiffness and above all a simplicity of construction and versatility heretofore unattained in the prior art. It is a particularly desirable manipulator device for use in hazardous environments such as outer space, nuclear reactors, chemical processes or the like. The seven degrees of freedom provided by the present invention provide the arm with obstacle avoidance capabilities such as those generally illustrated in connection with the description of operation with reference to FIGS. 12A through 12B together with a cost reducing replication of parts and fabrication by the achievement of modularity of the joint interfaces.

The present invention having been thus described, it should be apparent that modifications could be made to the various components of the system, as would occur to one of ordinary skill in the art without departing from the spirit and scope of the present invention.

What is claimed is:

1. Modular multimorphic kinematic control arm means for selective manipulation of objects and the like comprising:

support means for holding said arm means;

substantially identical shoulder, elbow and wrist joint means interconnected by link means, each of said joint means providing relative pitch and yaw motions between those of said link means joined thereby, and said shoulder joint being mounted on said support means via a said link means, each said joint means including, traction driven output roller means mounted for rotation about orthogonal pitch and yaw axes in said link means, traction drive input means having first and second drive roller means for selectively rotating in like and opposite directions, differential traction roller means in said link means engaging said output roller means for constraining said output roller means to rotate about said pitch and yaw axes, respectively, said differential traction roller means having first and second traction roll means independently rotatable about said pitch axis, engaged respectively, by said first and second drive roller means and being responsive thereto to rotate selectively, in like and opposite directions, and said traction drive input means engaging said differential traction roller means to selectively impart rotations thereto for controlling the rotation of said output roller means about said pitch and yaw axes, said output roller means being mounted for rotation about said yaw axis and engaged at substantially diametrically opposed positions by said first and second traction roll means and is constrained to rotate about said yaw axis in response to opposite directions of rotation between said traction roll means and said drive roller means and to rotate about said pitch axis in response to like directions of rotation of said traction roll means and said drive roller means, said shoulder, elbow and wrist joint means each providing two degrees of freedom to said control arm means;

said link means mounting said traction drive output means including a right angle mount for said traction drive output means, said right angle mount converting the orthogonal axes of rotation into pitch and yaw axes;

wrist roll means interconnected by a said link means to said wrist joint means and rotatable thereon for providing one additional degree of freedom to said control arm means in the total provision of seven degrees of freedom and obstacle avoidance capability in said control arm means; and end effector means mounted on said wrist roll means for manipulating a said object and the like in response to movements of said control arm means.

2. The modulator multimorphic kinematic control arm means of claim 1, wherein said wrist roll means comprise traction drives.

3. Modular multimorphic kinematic control arm means for selective manipulation of objects and the like comprising:

support means for holding said arm means;

substantially identical shoulder, elbow and wrist joint means interconnected by link means, each of said joint means providing relative pitch and yaw motions between those of said link means joined thereby, and said shoulder joint being mounted on said support means via a said link means;

said shoulder, elbow and wrist joint means each providing two degrees of freedom to said control arm means;

wrist roll means interconnected by a said link means to said wrist joint means and rotatable thereon for providing one additional degree of freedom to said control arm means in the total provision of seven degrees of freedom and obstacle avoidance capability in said control arm means; and end effector means mounted on said wrist roll means for manipulating a said object and the like in response to movements of said control arm means;

wherein said shoulder, elbow and wrist joint means each connect a support side link means and a manipulator side link means for relative motion thereof and comprise:

output drive means mounted for rotation about orthogonal pitch and yaw axes in said link means, said link means including a right angle mount converting the orthogonal axes of rotational into pitch and yaw axes;

differential drive means in said link means engaging said output drive means for constraining said output drive means to rotate about said pitch and yaw axes, respectively; and drive input means mounted in said support side link means and engaging said differential traction drive means to selectively impart rotations thereto for controlling the rotation of said output drive means about said pitch and yaw axes.

4. The modular multimorphic kinematic control arm means of claim 3, wherein said wrist roll means comprises a traction drive.

5. The modular multimorphic kinematic control arm means of claim 1, wherein said control arm means further includes position encoder means for providing an indication of the extent of each of said pitch and yaw motions in each of said joint means and the extent of rotation of said wrist roll means.

6. The modular multimorphic kinematic control arm means of claim 5, wherein, in each of said joint means there is a pitch axis and a yaw axis, and said position encoder means includes first and second rotary encoder means mounted on said pitch and yaw axes, respectively.

7. The modular multimorphic kinematic control arm means of claim 1, wherein:
said control arm means further includes position encoder means for providing an indication of the extent of each of said pitch and yaw motions in each of said joint means and the extent of rotation of said wrist roll means; and
said wrist roll means comprises a traction drive.

8. The modular multimorphic kinematic control arm means of claim 7; wherein, in each of said joint means there is a pitch axis and a yaw axis, and said position encoder means includes first and second rotary encoder means mounted on said pitch and yaw axes, respectively.

9. The modular multimorphic kinematic control arm means of claim 1, wherein:
said control arm means further includes position encoder means for providing an indication of the relative rotation of each said output roller means in each of said joint means on respective ones of said pitch and yaw axes and the extent of rotation of said wrist roll means.

10. The modular multimorphic kinematic control arm means of claim 3, wherein:
said drive input means comprises first and second drive roller means for selectively rotary in like and opposite directions;
said differential drive means comprises first and second traction roll means independently rotatable about said pitch axis, engaged respectively, by said first and second drive roller means and being responsive thereto to rotate, selectively, in like and opposite direction; and
said output drive means is mounted for rotation about said yaw axis and engaged at substantially diametrically opposed positions by said first and second traction roll means and is constrained to rotate about said yaw axis in response to like directions of rotation between said drive roller means and to rotate about said pitch axis in response to opposite directions of rotation of said drive roller means.

11. The modular multimorphic kinematic control arm means of claim 3, wherein said drive input means comprises first and second rotary input means selectively rotatable in like and opposite directions and acting through said differential drive means to compel said output drive means to rotate about said pitch and yaw axes in response, respectively, to said like and opposite directions of rotation of said first and second rotary input means.

12. In a multimorphic kinematic control arm, means for providing six degrees of freedom and obstacle avoidance capability similar to that of a human arm comprising:
first, second and third kinematically redundant pitch/yaw joint means simulating, respectively, shoulder, elbow and wrist joints of a human arm; and
link means for joining each said joint means to a related component of a said control arm;
each said joint means including,
traction driven output means mounted for rotation about orthogonal axes mounted to one said link means;
differential traction means mounted in a different one of said link means engaging said output means for constraining said output means to rotate about orthogonal axes, respectively; and
traction drive input means engaging said differential traction means to selectively impart rotations thereto for controlling the rotation of said output means about said orthogonal axes;
said link mounting said traction drive output means including a right angle mount for said traction drive output means, said right angle mount converting the orthogonal axes of rotation into pitch and yaw axes.

13. The means of claim 12 further comprising wrist roll means connected to said wrist joint for carrying an end effector means to manipulate a desired object and the like.

14. The invention defined in claim 13, wherein said joint means and said wrist roll means are traction drive means providing a substantially backlash free structure.

15. The invention defined in claim 13, wherein said wrist roll means comprises a traction drive.

16. The invention defined in claim 12, wherein:
said traction drive input means comprises first and second drive roller means for selectively rotating in like and opposite directions;
said differential traction means comprises first and second traction roll means independently rotatable about said pitch axis, engaged respectively, by said first and second drive roller means and being responsive thereto to rotate, selectively, in like and opposite direction; and
said output means being roller means and being mounted for rotation about said yaw axis and engaged at substantially diametrically opposed positions by said first and second traction roll means and being constrained to rotate about said yaw axis in response to opposite direction of rotation between said traction means and said drive roller means and to rotate about said pitch axis in response to like directions of rotation of said drive roller means.

17. The invention defined in claim 16, wherein said wrist roll means comprises a traction drive.

18. The invention defined in claim 12, wherein said traction drive input means comprises first and second rotary input means selectively rotatable in like and opposite directions and acting through said differential traction means to compel said output means to rotate about said pitch and yaw axes in response, respectively, to said opposite and like directions of rotation of said first and second rotary input means.

19. The invention defined in claim 18, wherein said wrist roll means comprises a traction drive.

20. Traction drive pitch/yaw joint means for providing two degrees of freedom in a manipulation linkage comprising:

first and seond rigid link means extending, respectively, into and out of said joint means for containing said joint means and assuming relative pitch and yaw positions to one another as constrained by said joint means;

servomotor means in said first link means for providing first and second rotary input drive motions, said input drive motions being selectively effected in like and opposite directions of rotation;

first and second traction drive input means connected with and driven by said servomotor means for assuming said first and second rotary input drive motions, respectively;

traction driven output roller means mounted in said second link means for rotation about orthogonal pitch and yaw axes in said joint means; and differential traction roller means in said first link means engaging said output roller means and said first and second traction drive input means for constraining said output roller means to rotate about said pitch and yaw axes in response to opposite and like rotational directions of said input drive motions, respectively;

said second link including a right angle mount for said traction drive output means, said right angle mount converting the orthogonal axes of rotation into pitch and yaw axes;

said second link means being mounted in said joint means for like rotation about said pitch and yaw axes with said output roller means.

21. The traction drive pitch/yaw joint means of claim 20, wherein:
said traction driven output roller means is journalled for rotation concentric with said yaw axis; and
said differential traction roller means is journalled for rotation concentric with said pitch axis.

22. The traction drive pitch/yaw joint means of claim 20, wherein:
said differential traction roller means comprises first and second traction roll means independently journalled for rotation about said pitch axis, engaged, respectively, by said first and second traction drive input means and being responsive thereto to rotate, selectively, in like and opposite directions; and
said traction driven output roller means is journalled for rotation about said yaw axis and engaged at substantially diametrically opposed positions by said first and second traction roll means and is constrained thereby to rotate about said pitch/yaw axes in response to opposite directions and like directions rotation, respectively, of said first and second traction drive input means.

23. The means of claim 12 wherein said traction drive input means is mounted inboard of each joint.

* * * * *